United States Patent [19]

Plourde

[11] Patent Number: 4,826,260
[45] Date of Patent: May 2, 1989

[54] PNEUMATIC SYSTEM FOR ENDLESS TRACK VEHICLES

[76] Inventor: Aimé Plourde, 2è rang centre, Trois-Pistoles, Canada, G0L 4K0

[21] Appl. No.: 118,617

[22] Filed: Nov. 9, 1987

[51] Int. Cl.$^4$ .............................................. B62D 5/08
[52] U.S. Cl. ...................................... 305/16; 305/24; 180/193
[58] Field of Search .................. 305/10, 16, 21, 22, 305/23, 24, 25, 27, 29, 31, 32; 180/9.1, 180, 182, 193

[56] References Cited

U.S. PATENT DOCUMENTS

| | | | |
|---|---|---|---|
| 3,721,308 | 3/1973 | Brandli et al. | 305/25 X |
| 3,944,005 | 3/1976 | Tomita | 305/16 X |
| 3,974,890 | 8/1976 | Noble | 305/24 X |
| 4,222,453 | 9/1980 | Fixsen et al. | 305/24 X |
| 4,314,618 | 2/1982 | Tamura | 305/24 X |
| 4,462,480 | 7/1984 | Yasui et al. | 180/9.1 X |
| 4,518,056 | 5/1985 | Kobayashi | 180/193 |

*Primary Examiner*—James B. Marbert
*Assistant Examiner*—Russell D. Stormer

[57] ABSTRACT

An air-adjustable shock absorber is pivotally connected at its ends to first arms of a front and of a back crank arm system, which are pivotally mounted to the vehicle chassis at the front and back of the same between the upper and lower runs of the endless track of the vehicle. The second arms of the front and back crank arm systems are connected to the front and back portion of the slides which engage the upper surface of the ground-engaging run of the endless track. The air pressure within the shock absorber unit biases the two crank systems in a direction so as to move the slides downwardly from the vehicle chassis. An air circuit system enables the driver to control the air pressure depending on the load carried by the vehicle. The crank systems are such that a greater proportion of the load is carried by the back of the suspension.

8 Claims, 5 Drawing Sheets

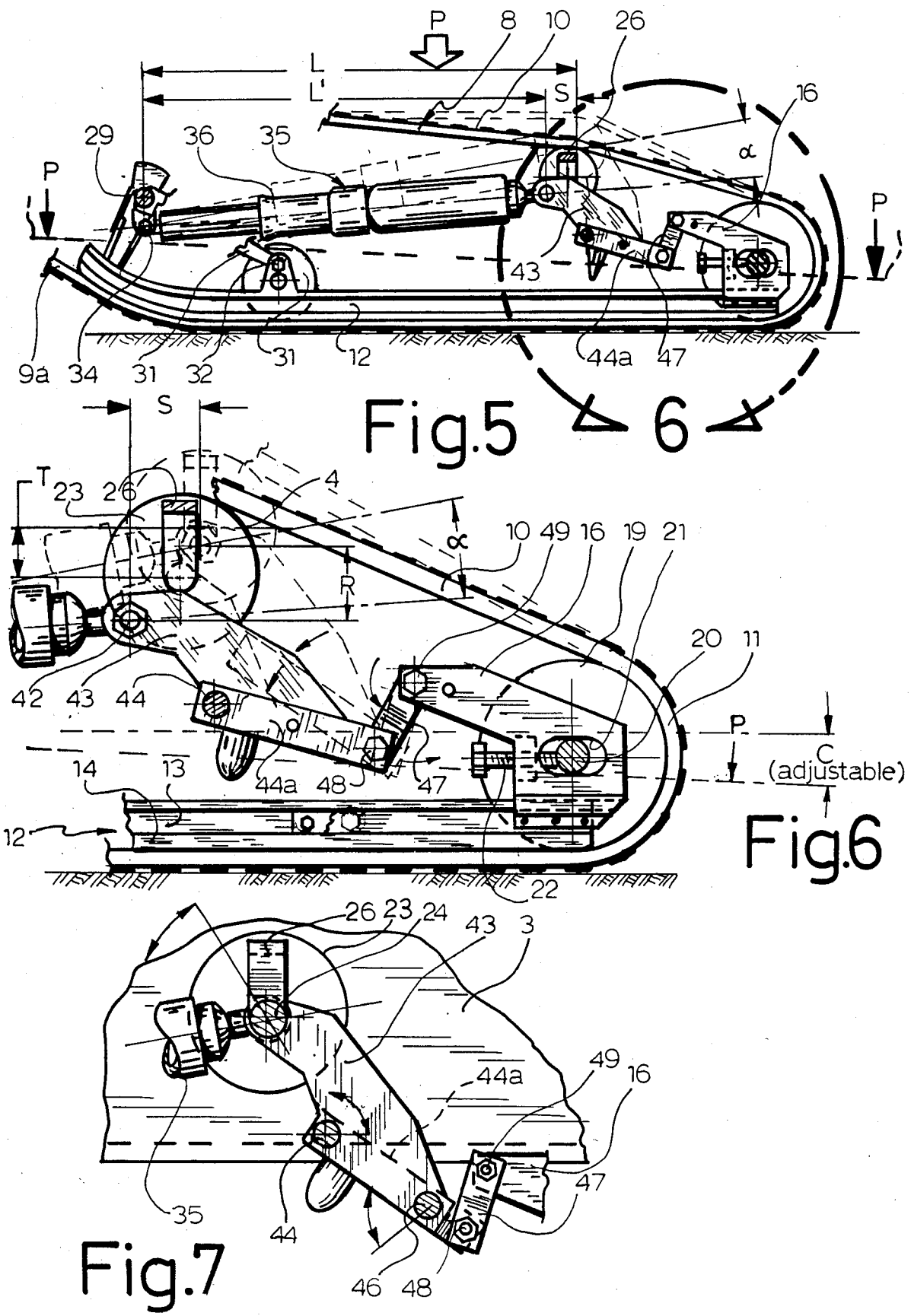

PNEUMATIC SYSTEM FOR ENDLESS TRACK VEHICLES

FIELD OF THE INVENTION

The present invention relates to a suspension for endless track vehicles.

BACKGROUND OF THE INVENTION

Up to now, the suspension of endless track vehicles, such as snowmobiles, consists solely of springs mounted at the front and at the back of the endless track. In a snowmobile, the ratio of the weight of the passengers to the weight of the vehicle is very high, for instance a ratio of 1/1 as compared to a ratio of 3/20 for a passenger vehicle. In a snowmobile, the spring suspension must be strong enough to support the maximum load intended to be carried by the vehicle. Such spring suspension is normally very stiff and is the cause of frequent back aches suffered by passengers of snowmobiles, especially so since such vehicles negotiate rough terrains. Conventional snowmobile suspensions also cause poor traction on slippery ground, since the endless track often fails to closely follow the ground contour.

OBJECTS OF THE INVENTION

It is therefore the general object of the present invention to provide a suspension for endless track vehicles, such as snowmobiles, which will obviate the above-noted disadvantages.

A more specific object of the present invention is to provide a suspension of the character described, the stiffness of which is adjustable in accordance with the load intended to be carried by the vehicle.

Another object of the invention is to provide a suspension of the character described, which can be adjusted so that a larger proportion of the load is carried by the back of the endless track than by the front of the same.

Another object of the invention is to provide a vehicle suspension which produces greater traction of the endless track of the vehicle.

Another object of the invention is to provide a suspension of the character described, which is of simple and inexpensive construction.

SUMMARY OF THE INVENTION

The suspension of the invention is associated with an endless track vehicle of the type having a chassis and an endless track under the chassis, including a lower ground-engaging run and an upper return run. The suspension is located between the return run and the ground-engaging run and comprises elongated bearing means resting on the lower run, first and second crank arm means pivoted to said chassis and connected to said bearing means at longitudinally-spaced locations; and an air-adjustable shock-absorbing unit pivotally interconnecting the first and second crank arm means, extension of said unit causing said bearing means to move said lower run away from said chassis. The air-adjustable shock-absorber unit is preferably mounted between the upper and lower runs centrally of the vehicle chassis. Preferably, the elongated bearing means consist of a pair of transversely-spaced slide members directly bearing on the inner surface of the lower run of the endless track. Preferably, the second crank arm means at the back of the chassis are connected to the slides through a linkage mechanism.

Another feature of the invention resides in the provision of shielding plates extending across the front portion of the conventional rear wheels carried by the rear end of the slides and engaging the junction between the upper and lower runs of the endless track.

BRIEF DESCRIPTION OF THE DRAWINGS

FIG. 5 is a partial longitudinal section taken along line 5—5 of FIG. 4;

FIG. 6, shown on the third sheet of drawings, is a partial, central, longitudinal section, on an enlarged scale, and taken in the area circumscribed by the double-arrow line indicated at 6 in FIG. 5;

FIG. 7 is a partial longitudinal section of part of the elements of FIG. 6 in another pivoted position;

FIG. 8 is a longitudinal section, on an enlarged scale, of the area circumscribed by the double-arrow line indicated at 8 in FIG. 5a.

DETAILED DESCRIPTION OF THE PREFERRED EMBODIMENT

Figure 1:
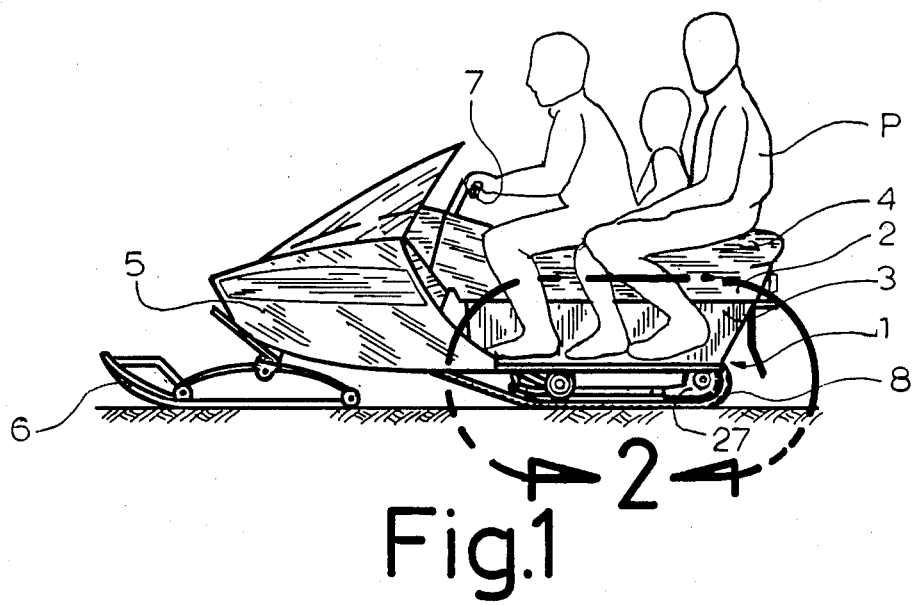
FIG. 1 is a side elevation of a snowmobile incorporating the suspension of the invention
Figure 3:
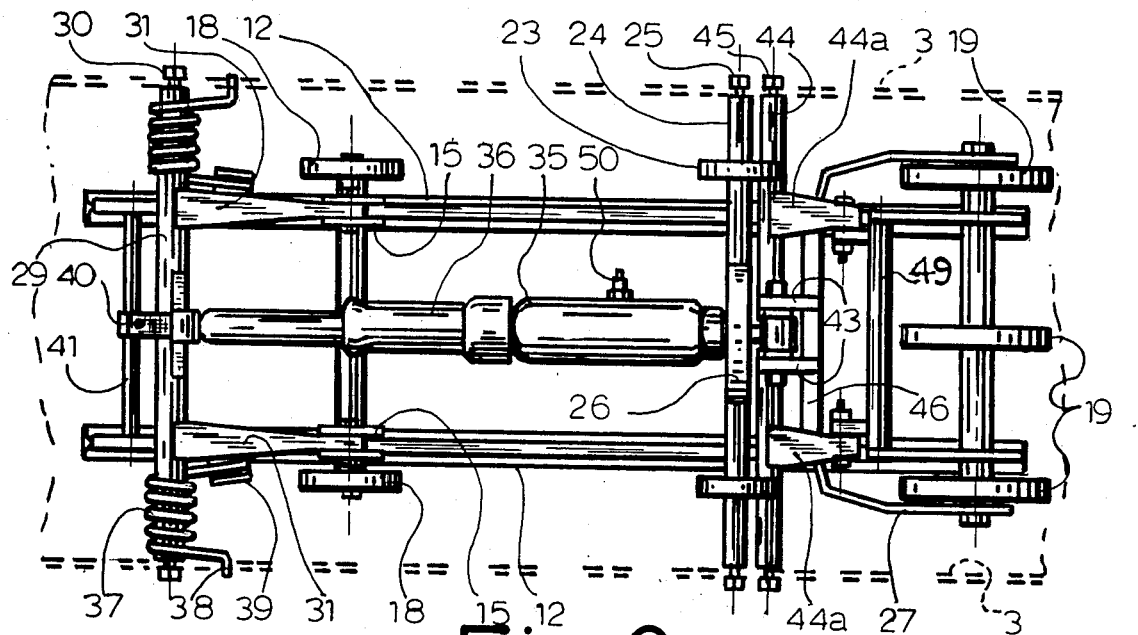
FIG. 3 is a top plan view of the suspension, taken along line 3—3 of FIG. 2.
Figure 4:
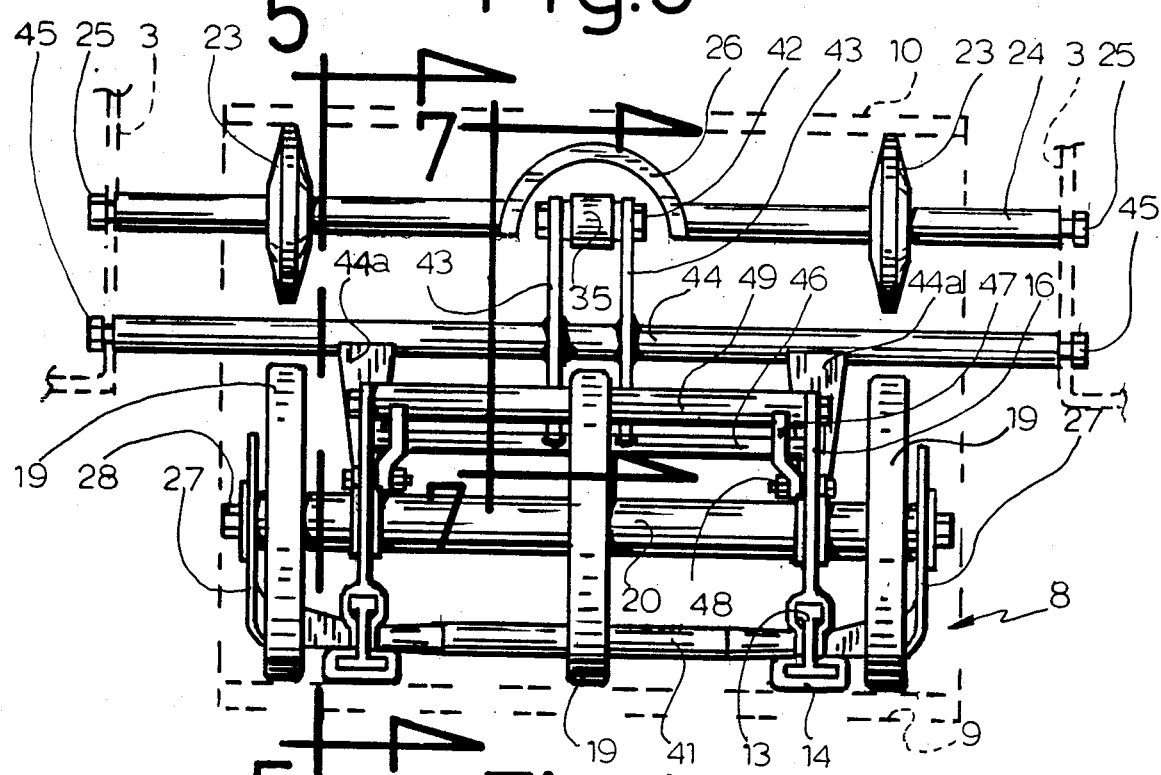
FIG. 4 is a rear end elevation with the endless track removed and taken along line 4—4 of FIG. 2.
Figure 5A:
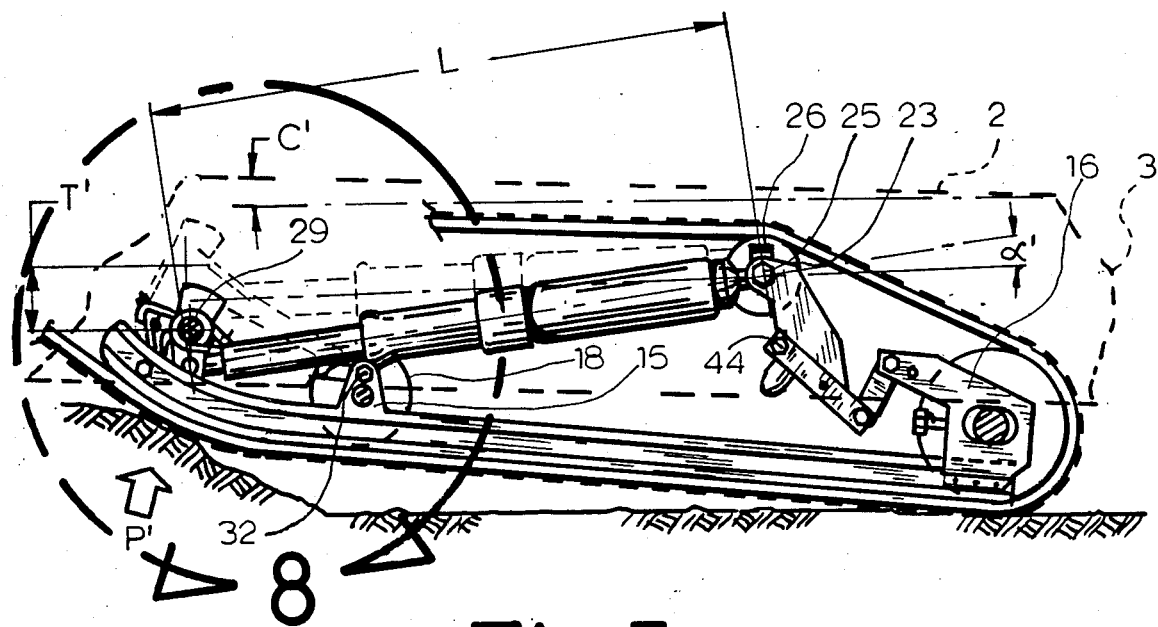
FIG. 5a, shown on the fourth sheet of the drawings, is a view similar to that of FIG. 5, but showing another position of the suspension assembly.
Figure 8:
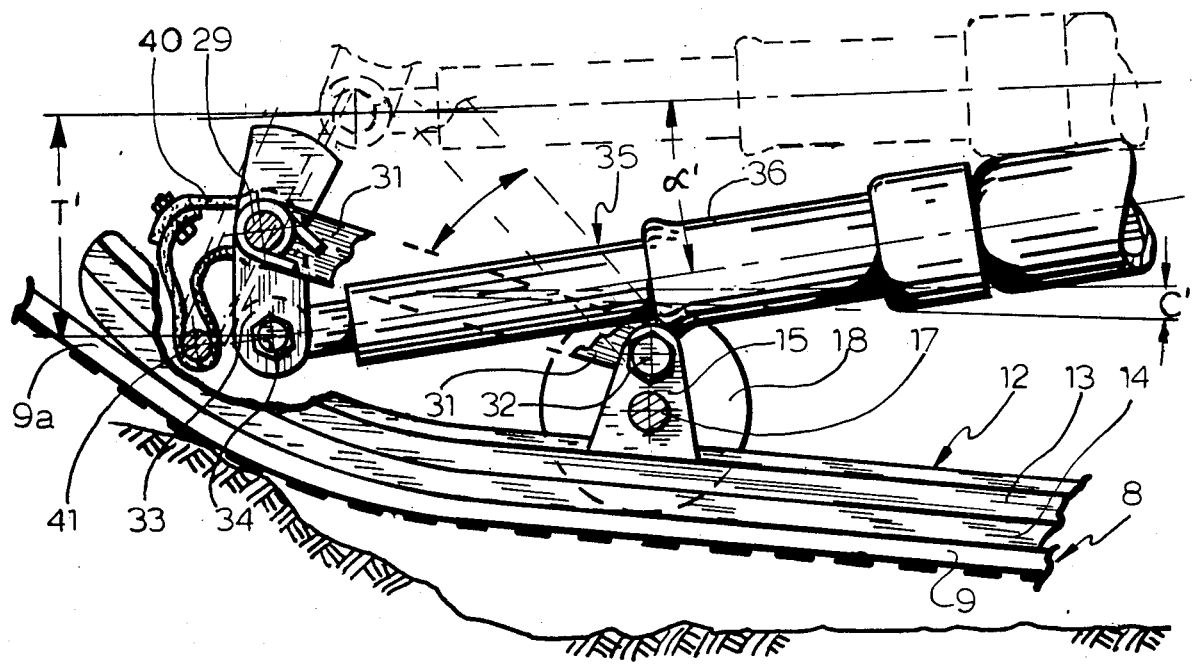

FIG. 1 shows a snowmobile of generally conventional construction, except for the suspension of the invention, said snowmobile comprising a chassis 1, of elongated shape and of inverted U-shape cross-section defining a horizontal transverse web 2 and lateral downwardly-extending flanges 3 (see also FIGS. 3 and 4). Web 2 supports a seat 4 (see FIG. 1) on which are seated passengers P, the front passenger being the driver for controlling an internal combustion engine mounted within a hood 5 at the front of the vehicle and also steering the front-mounted skis 6 through a steering handle 7. A flexible endless track 8 is mounted between the flanges 3 and under the web 2 of the chassis 1. The endless track 8 comprises a ground-engaging lower run 9 with a forwardly- and upwardly-inclined portion 9a and an upper return run 10 joining with the lower run 9 at the back of the vehicle through the curved junction part 11. The endless track 8 is driven by suitable sprocket wheels, not shown, at the front of the vehicle and engaging the front portion of the endless track in a conventional manner. A pair of laterally-spaced slides 12 slidably engage the inner upper surface of the ground-engaging lower run 9, said slides consisting of rigid steel members 13 carrying at its underside a strip 14 of synthetic resin to provide a slippery surface in contact with the lower run 9. As shown in FIGS. 5 and 8, each slide 12 carries an upstanding front bracket 15 and an upstanding rear bracket 16 at the front portion and at the rear end of the slide, respectively. The two front brackets 15 preferably carry a transverse axle 17 on which are rotated idle wheels 18 engaging the inner surface of the lower run 9 to decrease the friction between the same and the slides 12. A pair of transversely-spaced rear wheels 19, carried by a transverse axle 20, engage the inner surface of the endless track at the curved junction 11 thereof to guide the track in a curved path. The tension of the endless track is adjusted by means of these rear wheels 19 as follows: the axle 20 is mounted in a longitudinal slot 21 of bracket 16 and a tightening screw 22 screwed within the bracket 16 engages the axle 20 to bias the same rearwardly of the vehicle.

The rear portion of the return run 10 is supported by a pair of idle wheels 23 (see FIGS. 3, 4, and 6) rotatably mounted on a shaft 24 extending transversely of the vehicle and secured as by bolts 25 to the side flanges 3 of the chassis 1. The idle wheels 23 engage the inner surface of return run 10. In order to effect clearance for other parts of the suspension mechanism, the shaft 24, as shown in FIG. 4, is made in two sections interconnected by a central arch member 26.

Figure 2:
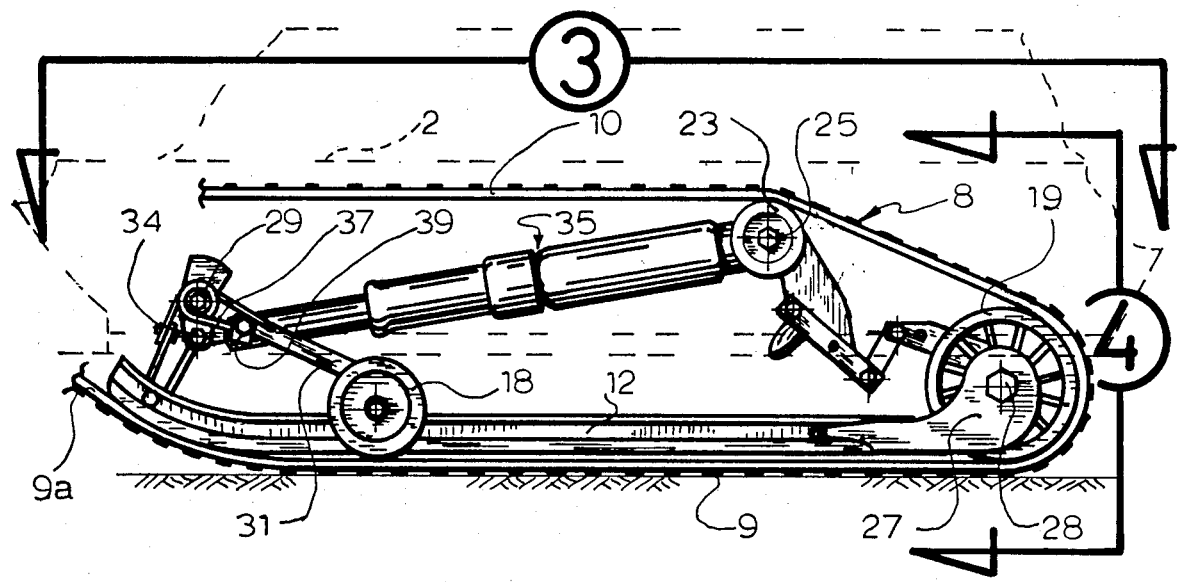
FIG. 2 is a side elevation of the suspension assembly and taken in the area circumscribed by the double-arrow line indicated at 2 in FIG. 1.

In accordance with one feature of the present invention, a shielding plate 27 is associated with each rear idle wheel 19 (see FIGS. 2, 3, and 4). As shown in these figures, the two laterally outermost idle wheels 19 are normally mounted on the outside of the respective slides 12 and a passenger foot can be easily caught in the nick between these wheels 19 and the lower endless track run. Shielding plates 27 prevent this occurrence. These shielding plates have a forward extension fixed to the slide 12 extending outwardly across the front of the wheel 19 and spaced therefrom, and then upwardly extending to be secured to the axle 20 of these wheels, as per a bolt 28.

As shown in FIGS. 2, 3, and 8, tubular shaft 29 extends across the front portion of the chassis 1 and is rotatable on a rod secured to the side flanges 3 underneath web 2 by bolt 30. A pair of crank arms 31 are secured at one end to the shaft 29, while their free outer ends are pivotally connected to the respective front brackets 15 by means of pivot bolts 32. Crank arms 31 downwardly rearwardly extend from shaft 29. A shorter centrally-located crank arm 33 downwardly extends from shaft 29, being secured thereto, and its outer end is pivotally connected by a pivot bolt 34 to one end of an air-adjustable shock-absorber unit 35, itself of known construction. Such a unit is marketed under the registered trade mark Delco. It combines a conventional shock-absorbing system in which a liquid is metered through a restricted opening made in a piston, so as to dampen the movement of the piston in its cylinder under shock, and the whole shock-absorbing unit can be extended to an adjusted degree under the action of an air chamber, partly defined by a flexible skirt, shown at 36. Therefore, the overall length of the unit can be adjusted to compensate for a given compression load exerted on its two ends. This adjustment is effected by adjusting the air pressure fed to the unit.

Unit 35 is centrally located with respect to the vehicle chassis and is disposed within the space encompassed by the endless track 8. The rear end of the unit 35 is pivotally connected to a rear crank arm system to be described hereinafter.

The front crank arms 31 are urged downwardly in a clockwise direction under the action of coiled springs 37, which assist the action of the air-adjustable shock-absorber unit 35 to lower the slides 12, that is to move the same in a direction away from the chassis 1.

Coil springs 37 are clearly shown in FIG. 3, one end 38 being secured to the respective side flanges 3 of chassis 1, while the other end is retained by a bracket 39 secured to each crank arm 31. As shown more clearly in FIG. 8, a strap 40 surrounds shaft 29 and a retainer rod 41, extending across and fixed to the front end of the slides 12. Strap 40 limits the downward movement of the front portion of the slides under the combined action of the coil springs 37 and of the pneumatic unit 35. The rear end of unit 35 is pivotally connected at 42 to a pair of crank levers 43, which freely extend through the arch 26 and which are mounted intermediate their ends on a shaft 44, which extends transversely of the vehicle chassis and is retained to the chassis flanges 3 by means of bolts 45. (see FIG. 4). A pair of downwardly-inclined arms 44a are secured to shaft 44.

A transverse rod 46 is secured to the lower end of crank levers 43 and to arms 44a near their ends. The outer end of each arm 44a is pivotally connected to the respective brackets 16 by means of a link 47. Pivot bolt 48 and transverse rod 49 connect each link 47 to arm 44a and to the bracket 16, respectively. The arrangement is such that the extension force exerted by unit 35 tends to pivot crank levers 43 in a clockwise direction, so as to force the brackets 16 and, consequently, the slides 12 downwardly away from the web 2 of chassis 1.

It is to be noted that the same unit 35 exerts a downward force on the front and rear portions of the slides 12. The respective lever arms of crank levers 43 and of the crank arms 31 are chosen such that about 20% of the load will be resisted by the front portion of the suspension assembly, while about 80% of the load will be resisted by the rear portion of the suspension assembly.

Figure 9:
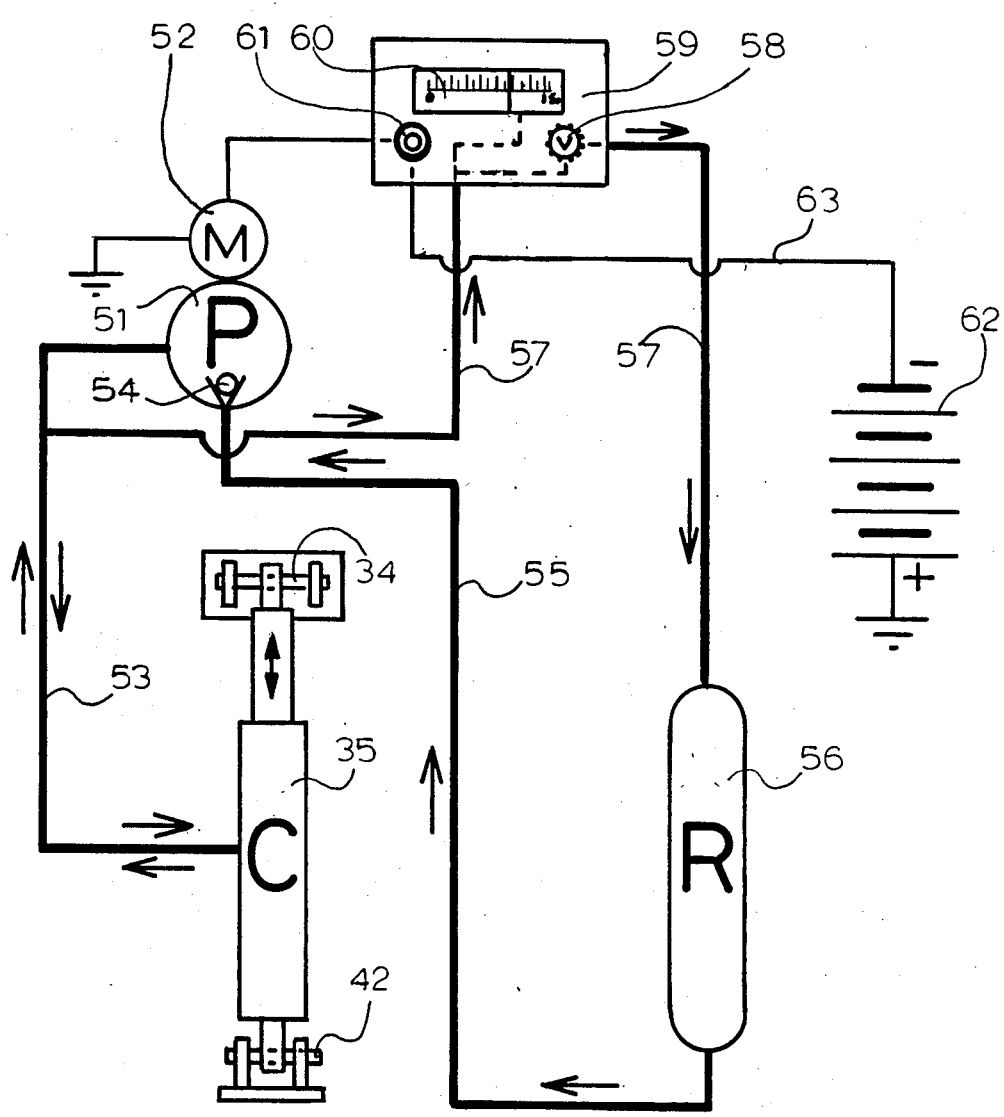
FIG. 9 is a schematic diagram of the pneumatic circuit.

As shown in FIG. 3, the unit 35 is provided with a nipple 50, which is connected to an air supply circuit in the manner shown in FIG. 9. In this figure, the combined shock-absorbing and air piston and cylinder unit is shown by letter C and its connection to the front crank assembly and to the rear crank assembly are schematically illustrated at 34 and 42, respectively.

The air circuit comprises an air pump 51 driven by an electric motor 52, which is normally supplied by the snowmobile battery. The pump 51 could be driven by any other suitable means. The output of pump 51 is connected by an air-line 53 to the nipple 50 of the unit 35. The intake of the pump 51 is provided with a check valve 54 and is connected by an air-line 55 to one end of an air reservoir 56 mounted on the snowmobile. A by-pass air conduit 57 connects air-line 53 to the other end of the reservoir 56. A manually-operated normally closed air valve 58 is series connected in the by-pass conduit 57 and is mounted on a control panel 59 mounted on the vehicle in a position clearly accessible to the vehicle driver. Panel 59 can be provided with a manometer gauge 60, also connected to the by-pass conduit 57 upstream from air valve 58 to indicate the air pressure within unit 35. Panel 59 also includes an electric control switch 61 accessible to the vehicle driver to control operation of the electric motor 52, which is supplied by the vehicle battery 62 through line 63. Pump 51, while being driven, supplies air from reservoir 56 to the unit 35 to increase the air pressure therein and thus cause extension of the same to the desired degree as determined by the air pressure indicated by gauge 60. Then the pump is stopped, the air pressure having been selected in accordance with the particular load on the vehicle. Whenever the air pressure needs to be decreased in unit 35, valve 58 is open, whereby the air from the unit 35 is bled back into the reservoir 56 through conduit 57. There is thus provided a closed air circuit, and in this circuit an anti-freeze agent, such as alcohol, is added to prevent any humidity contained in the air to form ice under cold weather conditions. Obviously, the volume of reservoir 56 is much greater than the volume of the cylinder and piston part of the air-adjustable shock absorber unit 35.

It is thus apparent that the softness of the vehicle suspension can be precisely adjusted in accordance with the load to be carried. It has also been found that the endless track more exactly follows the contour of the ground on which it travels, and, therefore, exerts a much more efficient traction than conventional spring-type suspensions.

What I claim is:

1. In an endless track vehicle including a chassis having a front end portion and a rear end portion, a flexible endless track for supporting said chassis and including a ground-engaging lower run and an upper return run, longitudinally-extending rigid slides engaging the upper face of said ground-engaging run, front and rear brackets fixed at longitudinally-spaced areas of each of said slides and upstanding from the latter, a first shaft rotatably carried by, and transversely of, said chassis at its front end portion, first crank arms having one end pivotally connected to the respective ones of said front brackets and their other ends fixed to said first shaft, a second crank arm fixed to said first shaft, a second shaft rotatably carried by and transversely of said chassis at its rear end portion, a crank lever fixed to said second shaft intermediate its ends, linkage means interconnecting said rear bracket s and one end of said crank lever, an air-adjustable shock-absorber unit pivotally interconnecting the other end of said crank lever and said second crank arm, extension of said air-adjustable shock absorber unit causing said slides to move away from said chassis, and further including means to adjust the air pressure within said unit.

2. In an endless track vehicle as defined in claim 1, further including at least two wheels engaging the inner surface of said track at the rear junction of said lower and upper runs, an axle on which said wheels are mounted and carried by said rear brackets, and means to adjust the position of said axle in said rear brackets longitudinally of said slides.

3. In an endless track vehicle as defined in claim 2, wherein said wheels are located transversely outside of the respective slides and further including shielding plates fixed to said slides forwardly of said wheel, extending spacedly across said wheels and fixed to said axle outwardly of said wheels.

4. In an endless track vehicle as defined in claim 1, wherein said unit is disposed longitudinally and centrally of said slides between said upper and lower runs.

5. In an endless track vehicle as defined in claim 6, wherein said chassis has an inverted U-shape cross-section defining a web for supporting seated passengers and two downwardly-extending flanges, means to support said upper run close to the underside of said web, said first and second shafts carried by said flanges between said upper and lower runs.

6. In an endless track vehicle as defined in claim 5, further including spring means bearing against said chassis and against said first crank arms and constantly biasing said slides away from said chassis.

7. In an endless track vehicle as defined in claim 1, further including means to feed pressurized air to said air-adjustable shock absorber unit, comprising an air reservoir, a power-driven pump having an inlet connected to said reservoir and an outlet connected to said unit, a by-pass conduit interconnecting said unit and said reservoir and a cut-off valve series connected in said by-pass conduit, said unit, reservoir and by-pass conduit forming a closed circuit, opening of said cut-off valve bleeding said unit to said reservoir.

8. In an endless track vehicle as defined in claim 7, wherein the air in said closed circuit contains an anti-freezing agent to prevent ice formation by the humidity which said air may contain.

* * * * *